Feb. 4, 1958    R. STEVENSON    2,821,996
RELIEF VALVE
Filed Sept. 10, 1953
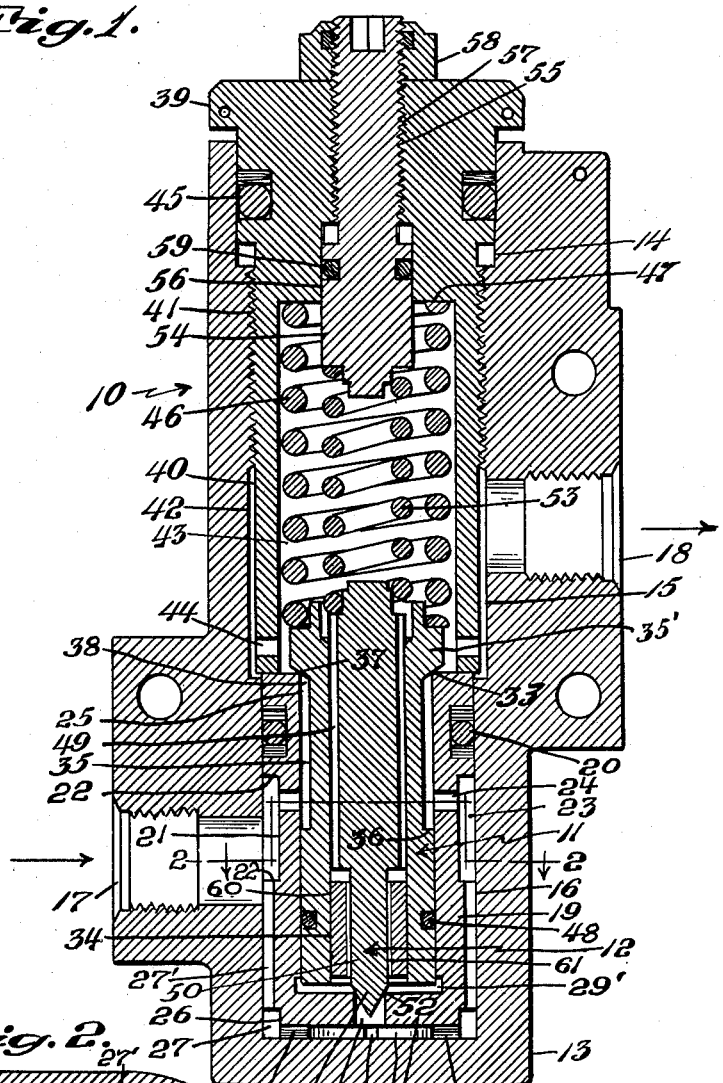
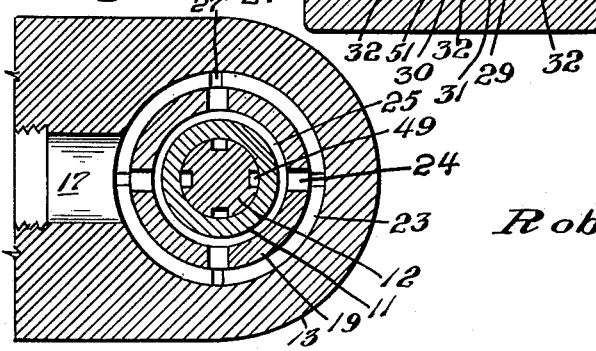
INVENTOR.
Robert Stevenson
BY
Barlow & Barlow
ATTORNEYS.

United States Patent Office 2,821,996
Patented Feb. 4, 1958

2,821,996

RELIEF VALVE

Robert Stevenson, East Greenwich, R. I., assignor to Merit Engineering, Inc., a corporation of Rhode Island Application September 10, 1953, Serial No. 379,406

5 Claims. (Cl. 137—490)

The invention relates to improvements in a relief valve in which the opening of a pressure responsive main valve is controlled by a pressure responsive pilot valve.

A valve of this general character forms the subject matter of Letters Patent No. 2,520,893 issued August 29, 1950, to Robert Stevenson.

An object of this invention is to provide a valve of the above character which can be manufactured at a lower cost than the structure of said patent and will be durable and satisfactory in use.

Another object of the invention is to provide a valve of the above character so constructed as to free the main valve of any effective fluid pressure thereon when the pilot valve is in closed position.

Another object of the invention is to provide a valve of the above character in which the closing portion of the main pressure responsive valve will be at the opposite end from the end where the effective area which is acted upon by the fluid pressure tending to move the valve to the open position is.

Another object of the invention is to provide for opening of the main valve at a predetermined percentage increase of a predetermined pressure and for closing of the main valve at a percentage pressure decrease of the said predetermined pressure.

With these and other objects in view, the invention consists of certain novel features of construction as will be more fully described and particularly pointed out in the appended claims.

In the accompanying drawings:

Figure 1 is a central longitudinal section through a relief valve embodying my invention;

Figure 2 is a sectional view taken substantially along lines 2—2 of Figure 1 looking in the direction of the arrows thereon.

In carrying out my invention, I provide a pressure responsive main valve which I slidably mount in a guide sleeve, and I provide in the adjacent walls of said guide sleeve a first passage for fluid from the conduit for liquid to be relieved, which I refer to as the relief port, to the other port referred to as a return port. I arrange for the areas on this main valve exposed to pressure from this first passage to be in balance with each other on the relief port side of the seat of said valve, whereby the main valve will be balanced on this side of the valve seat to any pressures at said relief port. Thus, a spring pressure opposing opening of the valve may be constant for any relief port pressures. I also provide for a second passage from the relief port to the return port, and the fluid in this passage under relief port pressure I employ as the force to act on the valve to move the same against the opposing force of a spring. The second passage is controlled by means of a pressure responsive pilot valve which is arranged to open at a predetermined pressure at the relief port. The passage of the fluid to the return port on the return port side of the pilot valve is restricted in a controlled manner such that a controlled drop in pressure on the said return port side of the pilot valve may be had in order that the main valve may open upon a predetermined percentage rise in pressure. A very slight opening of the pilot valve will be sufficient to provide the necessary force to act on the exposed area of the main valve to move the same to open position in accordance with specified predetermined percentage rise in relief port pressure.

Referring to the drawings, the valve 10 comprises a body casing or envelope 13 having a central bore 14 extending inwardly from the upper end thereof, which bore is reduced as at 15 and further reduced as at 16. An inlet port 17, which because it is connected to the conduit to be relieved is called a relief port, communicates with the central bore, while an outlet port 18, which is connected to the return line and is therefore referred to as a return port also communicates with this central bore of the body. I provide a division of flow lines between the inlet and outlet ports by a sleeve 19 which is inserted in the bore 16. This sleeve is reduced as at 26 and has its bottom recessed as at 31 with slots 32 connecting the recess with the space 27 and with longitudinal grooves 27' which direct liquid downwardly to the space 27 below the sleeve from whence the liquid may pass through slots 32 to an opening 30 in the bottom 29 of the sleeve to the inner portion of the sleeve. The other flow line from the inlet port 17 is through the annular recess 21 formed between shoulders 22 connecting port 17 and the radial openings 24 in the sleeve from whence liquid may pass upwardly within the sleeve and thence to the outlet or return port 18 through radial openings 44 in the cap 39 which extends from the upper end inwardly to engage the sleeve and hold it in position. This cap has threaded engagement as at 41 with the threads of the bore 15 and is recessed to receive a sealing O-ring 45 to block the passage of fluid outwardly.

The main valve 11 is slidably guided in the sleeve 19 and is essentially tubular in form, which assists in the provision of the two different flow lines between the inlet and outlet ports. This valve is provided with a head 35' at its upper end having a beveled surface 37 at the lower portion of the head where it is reduced into a smaller waist portion 35 with a shoulder 36 at one end for a sufficient axial length to uncover and permit free discharge of liquid passing through the openings 24 into this reduced portion between the valve and the sleeve. This beveled portion 37 of the head engages the valve seat 33 at the upper end of the sleeve 19 which is right angular and provides a substantially knife edge engagement between it and the inclined neck portion 37 which is at substantially 45 degrees to the two surfaces making the right angle seat 33. By this arrangement liquid which enters the port 17 and passes through the openings 24 is directed upwardly along the outer surface of the main valve 11 and by engaging surfaces 36 and 37 of the same inner and outer diameter maintain the main valve 11 in balance as to the pressure at port 17.

Within the main valve 11 there is slidably guided the pilot valve 12. The pilot valve 12 is provided with recesses or grooves 49 extending lengthwise thereof and is reduced at its lower portion as at 50 and pointed at its end 51 along a beveled surface which may engage the valve seat 52 formed at the upper end of the opening 30 in the sleeve. The lower reduced portion of the pilot valve is surrounded by a sleeve 34 providing a bore 61 slightly larger than the pilot valve portion 50 so that there is always communication although through a restricted passage between the chamber 29' formed below the lower end of the main valve 11 and the return port. It will be noted that the first flow line above described thus continues separate from the flow line through the ports 24, as this flow line passing through the opening 30 in the sleeve when the pilot valve is withdrawn continues on through the restricted passage at 61 about the pilot valve, thence through the grooves 49 and out of the upper end of the main valve and thence to the return port 18.

The O-rings 48 in the main valve prevent liquid from passing up along the outer surface of the main valve, which liquid has passed through the opening 30 in the bottom of the sleeve. O-rings 20 in the sleeve also prevent the passage of liquid along the outside of the sleeve from the port 17 to the return port 18.

The main valve is urged toward its seat by a spring 46 which maintains a substantially constant pressure upon the main valve at all times, urging it towards its seat. A spring 53 within the confines of the spring 46 presses upon the pilot valve, urging it through the main valve to its seat, which spring may be adjusted by the threaded member 54 sealed in bore 56 by an O-ring seal 59 which passes through the threads 55 having its threads 57 engaging therewith and which may be operated externally to set the spring 53 in the position desired for the pressure which it is desired that the pilot valve open at. This screw is held in adjustment by a lock nut 58 at its upper outer end. The pressure of spring 53 determines the pressure at which the main valve will open, which we may assume for illustration to be one thousand pounds. Thus, when the pilot valve is subjected to one hundred pounds per square inch pressure existing at the port 17, this pilot valve will move upwardly as seen in Figure 1, and the valve 51 will be unseated, allowing liquid to enter through opening 30 into chamber 29' where the increased area in this chamber pressing upon the lower end of the main valve will cause the main valve to open, unseating as at 33, so that liquid may pass through the openings 24 along the waist portion 35 and out the return port until the pressure is relieved at the conduit which is connected to port 17.

Upon a drop of pressure at the port 17 to a predetermined value, for example eight hundred pounds, the spring 53 will return the pilot valve 12 to seated position on seat 52. In this case the pressure will then be cut off from the chamber 29' and the pressure at the time of the closing of the pilot valve 51 in this chamber 29 will gradually decrease as the liquid passes through the restricted opening 61 to the return port, and as the liquid does pass out of this chamber 29' relieving the pressure on the lower end of the main valve, the main valve will move under the urge of its spring 46 to its seat 33.

The main valve 11 by reason of the reduced waist portion 35 not only provides a balanced area at both ends of the chamber formed about this waist portion but also serves to reduce the weight of the main valve a substantial amount. The pilot valve by reason of the grooves 49 extending throughout its length and the small portion 12 which fits loosely in the sleeve 61 provides for easy assembly of the pilot valve in the main valve, and no press fits are required.

I claim:

1. In a relief valve having a relief port and a return port, a first passageway from said relief port to said return port, a first valve seat in said first passageway, a second passageway from said relief port to said return port, a second valve seat in said second passageway, a pressure responsive main valve for controlling the flow of fluid through said first passageway and normally seated on said first valve seat and having a central bore therethrough forming part of said second passageway, a sleeve in said bore at the end portion thereof distant from the first valve seat, a resilient means for opposing the unseating of said main valve, a pressure responsive pilot valve for controlling the flow of fluid through said second passageway and subjected to relief port pressure tending to unseat said pilot valve and resilient means normally seating the pilot valve on said second valve seat, said pilot valve having a stem slidably guided in said bore and only partially obstructing said bore, said stem having a reduced portion extending through said sleeve and of a diameter smaller than the diameter of the bore of said sleeve to provide a vent conduit between said reduced stem portion and said sleeve, said main valve having a pressure area at a position in said second passageway on the return port side of said second valve seat exposed to relief port pressure acting thereon in a direction to unseat said main valve upon the unseating of said pilot valve, and said main valve having opposite balanced pressure areas at a position in the said first passageway on the relief port side of said first valve seat subjected to relief port pressure when said main valve is seated on said first valve seat whereby said resilient means is constant for all relief port pressures.

2. In a relief valve having a relief port and a return port, a first passageway from said relief port to said return port, a first valve seat in said first passageway, a second passageway from said relief port to said return port, a second valve seat in said second passageway, a pressure responsive main valve for controlling the flow of fluid through said first passageway and normally seated on said first valve seat and having a central bore therethrough forming part of said second passageway, a sleeve in said bore at the end portion thereof distant from the first valve seat, resilient means for opposing the unseating of said main valve, a pressure responsive pilot valve for controlling the flow of fluid through said second passageway and normally seated on said second valve seat and exposed to relief port pressure tending to unseat said pilot valve, said pilot valve having a stem slidably guided in said bore and only partially obstructing said bore, said stem having a reduced portion extending through said sleeve and of a diameter smaller than the diameter of the bore of said sleeve to provide a vent conduit between said reduced stem portion and said sleeve, resilient means for opposing the unseating of said main valve, said main valve having a pressure area at a position in said second passageway on the return port side of said second valve seat subjected to relief port pressure acting thereon in a direction to unseat said main valve upon the unseating of said pilot valve.

3. In a relief valve having a relief port and a return port, a first passageway from said relief port to said return port, a second passageway from said relief port to said return port, a normally seated pressure responsive main valve for controlling the flow of fluid through said first passageway and having a central bore therethrough forming part of said second passageway, a sleeve in said bore at the end portion thereof distant from the first valve seat, said valve having opposite balanced pressure areas subjected to relief port pressure in said first passageway and a pressure area exposed to relief port pressure from said second passageway acting thereon in a direction tending to unseat said main valve, and a normally seated pressure responsive pilot valve for controlling the flow of fluid in said second passageway to the said exposed pressure area on said main valve, said pilot valve having a stem slidably guided in said bore and only partially obstructing said bore, said stem having a reduced portion extending through said sleeve and of a diameter smaller than the diameter of the bore of said sleeve to provide a vent conduit between said reduced stem portion and said sleeve.

4. In a relief valve as set forth in claim 3 wherein said pilot valve in the guided stem portion thereof has a plurality of grooves therein for the passage of the fluid through said main valve.

5. In a relief valve as set forth in claim 3 further comprising a valve body having a bore therein forming part of said second passageway, a guide sleeve for said main valve, said guide sleeve having a first valve seat for said main valve and a bottom wall provided with a central opening therethrough to the interior of said sleeve, a second valve seat about said opening for said pilot valve, said first passageway extending exteriorly of said main valve and through said first valve seat, and said second passageway extending through said opening and interiorly through said main valve, said guide sleeve extending into said bore to engage in the bottom thereof and only partially obstructing said bore to the passage of the flow to said second valve seat.

References Cited in the file of this patent

UNITED STATES PATENTS

| | | |
|---|---|---|
| 246,088 | Curtis | Aug. 23, 1881 |
| 802,132 | Anderson | Oct. 17, 1905 |
| 953,403 | Turner | Mar. 29, 1910 |
| 2,587,161 | Huber | Feb. 26, 1952 |
| 2,601,870 | Lee | July 1, 1952 |